YOCOM & COWAN.
Railway Car Brake.

No. 96,375.    Patented Nov. 2, 1869.

Witnesses
David R. Smith
Alfred Frick

Inventors
G. W. B. Yocom & E. Cowan
By their Atty
C. W. M. Smith

United States Patent Office.

GEORGE W. B. YOCOM AND EDWARD COWAN, OF ARCATA, CALIFORNIA.

Letters Patent No. 96,375, dated November 2, 1869.

IMPROVED RAILWAY-CAR BRAKE.

The Schedule referred to in these Letters Patent and making part of the same.

*To all whom it may concern:*

Be it known that we, GEORGE W. B. YOCOM and EDWARD COWAN, of Arcata, in the county of Humboldt, and State of California, have invented a certain new and useful Car-Brake; and we do hereby declare that the following is a full and exact description of the same, reference being had to the accompanying drawings, and to the letters of reference marked thereon.

Our invention consists of two arms or bars of equal lengths, having bevelled ends, and provided with toggle-joints, so connected that they may be brought into a straight line between the two wheels, and be made to produce great pressure when the necessary force is applied to bring them into position.

In the drawings—

Figure 1:
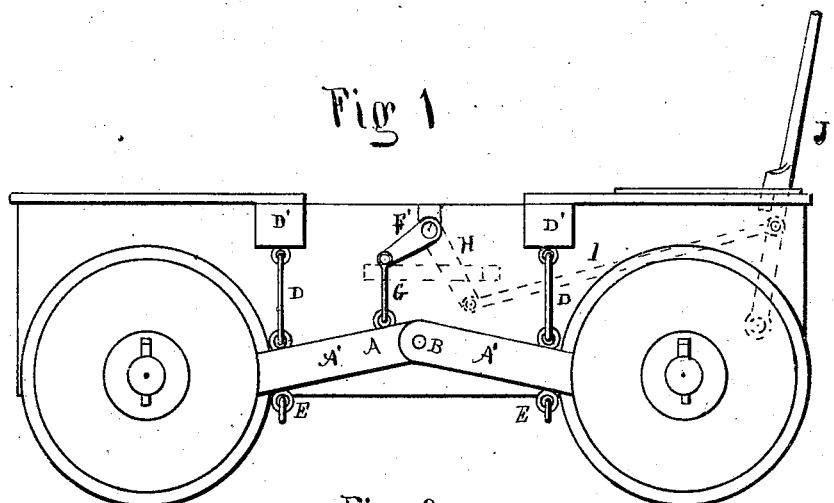
Figure 1 is a side elevation of our device.
Figure 2:
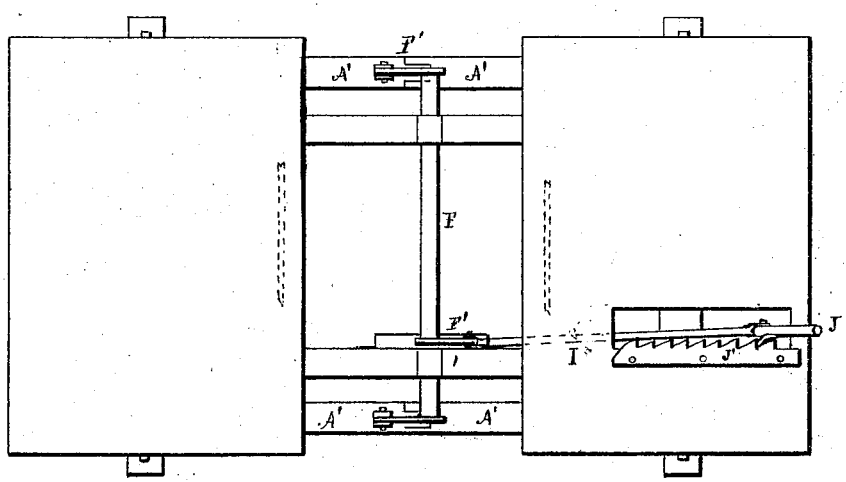
Figure 2 is a plan.

To enable others skilled in the art or science to which it most nearly appertains, to make and use our invention, we will proceed to fully describe its construction and operation.

The brake A is constructed with two arms, A' A', of equal lengths, with bevelled ends, and is placed between the two wheels of the car, the ends of the arms reaching the wheels below their centres.

The brake is provided about midway with a toggle or knee-joint, B, with outer angle uppermost.

Each end of the brake is connected by links D D to the cross-beams of the car D' D', and below by transverse connection-rods E E, passing beneath the car.

A crank-axle, F, passes transversely through the frame of the car, the ends of which are provided with arms F' F', by which connection is made with the brakes by the links G.

An arm, H, is attached to the axle, to which the connection-rod I is made with the lever J, which extends up through the platform, and engages in the teeth J' of the rack, which holds the brake in position when set. When the brakes are raised, the cranks are horizontal with the car-frame, and when lowered, the elbow is forced down, and the bevelled ends of the arms act against the rim of the car-wheels.

A very slight power applied to the lever or wheel, will be sufficient to stop the car-wheels from turning, no matter at what speed the car is being propelled. At the same time the brake is almost entirely under control, and the force with which it is thrown against the wheels may be regulated at the will of the brakeman.

For use on cars employed on street-railroads, as well as steam-cars, it is confidently believed our device is superior to any brake heretofore employed.

Having thus described our invention,

What we claim, and desire to secure by Letters Patent, is—

1. The brake A, consisting of two arms, A' A', with bevelled ends, and joint B, constructed and arranged substantially as described, and for the purpose set forth.

2. The crank-axle F with arms F', by which connection is made with the brake by the link G, in combination with the said brake A, substantially as specified.

In witness whereof, we have hereunto set our hands and seals.

GEORGE W. B. YOCOM. [L. S.]
    EDWARD COWAN. [L. S.]

Witnesses:
 GEORGE W. REDMAN,
 CORYDON CASTON.